March 13, 1928.                                                            1,662,366
M. C. COSGRAY
AUTOMATIC ELECTRIC SERVICE SYSTEM
Filed April 23, 1923
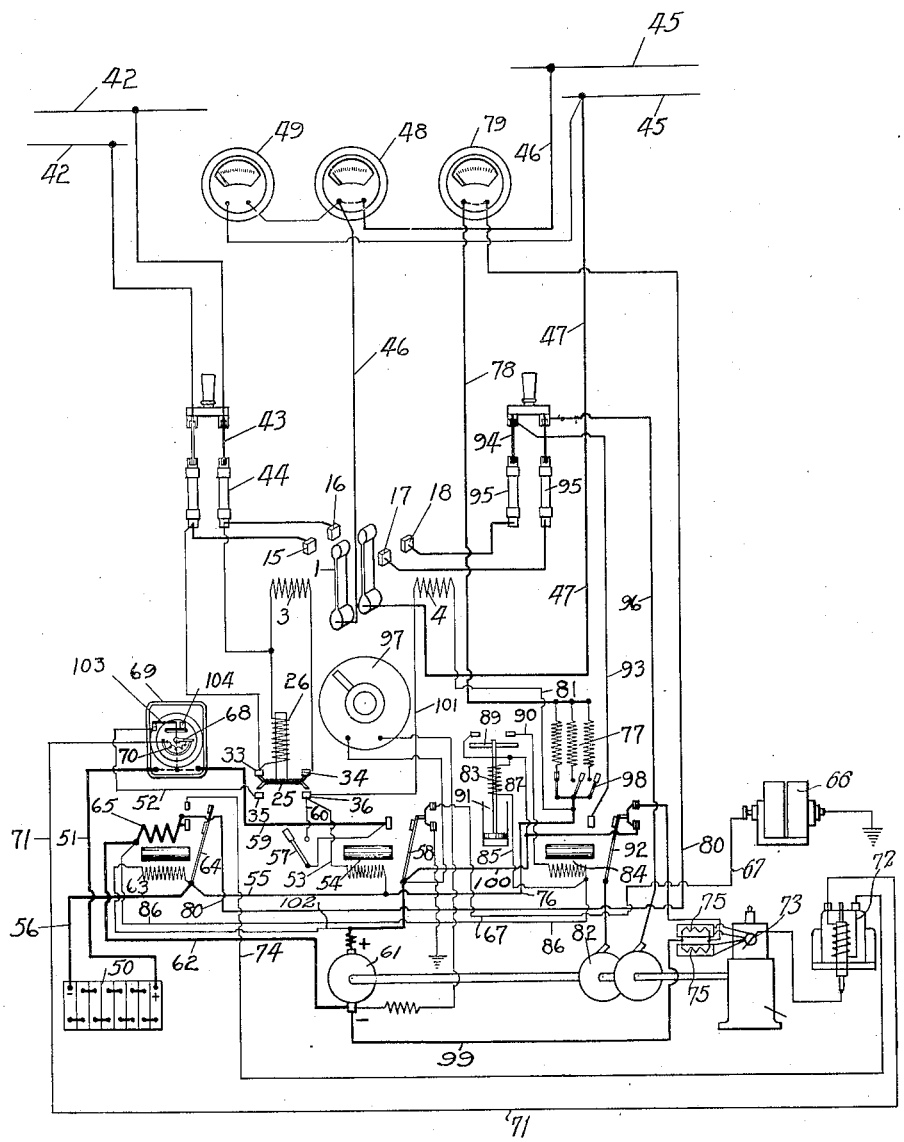
INVENTOR
Mark C. Cosgray
by
Owen Owen & Crampton Patented Mar. 13, 1928.

1,662,366

UNITED STATES PATENT OFFICE.

MARK C. COSGRAY, OF SANDUSKY, OHIO, ASSIGNOR, BY MESNE ASSIGNMENTS, TO MYER PRUSSIAN, OF DETROIT, MICHIGAN.

AUTOMATIC ELECTRIC SERVICE SYSTEM.

Application filed April 23, 1923. Serial No. 633,870.

My invention has for its object to provide an auxiliary source of supply of electric energy that will be automatically connected when the main supply falls below a predetermined amount. The auxiliary source may supply a direct or alternating current according to the character of the translating devices or instruments operated on the line or consuming circuit. The invention has other advantages and features which appear from the following description and upon examination of the drawings.

The invention may be contained in systems and devices of different forms. To illustrate a practical application of the invention I have selected one of the systems containing the invention and shall describe it hereinafter. The system selected is illustrated in the accompanying drawings.

The figure illustrates diagrammatically an electric system embodying my invention.

The system shown in the figures is provided with an automatic main line switch for connecting the system to be supplied either with the main source of supply or with the auxiliary source of supply which is operated according to the potential of the current furnished by the main source of supply. The automatic switch may thus be operated to connect the auxiliary source of supply with the consuming circuit when the potential of the main source of supply falls below a predetermined point and to connect the consuming circuit with the main source of supply when the potential of the source of supply rises to a predetermined point.

In the form of the invention shown the translating devices are operated by an alternating current, that is, the current of the main source of supply is an alternating current and consequently the system selected for purposes of illustration is designed to supply an alternating current as an auxiliary source. In the system shown the automatic switch 1 connects either the main source of supply of alternating current or the auxiliary source of supply with the consumption circuit, and the switch 25 is controlled by the potential of the circuit of the main source of supply to cause the operation of the switch 1 and the other parts of the system. The switch 25 is the controlling switch that is operated according to the potential of the current of the main source of supply.

The auxiliary circuit is provided with an alternating current generator which is connected through the main switch 1 to the consuming circuit when the potential of the main source falls below a predetermined amount, such as when it falls a material amount below 125 volts. The alternating current generator is driven by a suitable source of power, such as by an internal combustion engine, which is started by dynamo that operates the engine until the engine receives its power from the liquid fuel or gas supplied thereto, whereupon the load of the consuming circuit will be thrown upon the generator. The dynamo will also operate as a direct current generator which will supply current to a storage battery by which it may be driven as a motor in starting the engine. The dynamo and the generator may be connected to a common shaft and to the crank shaft of the dynamo. Means is provided whereby the starting of the engine may be assured to produce an exceedingly reliable auxiliary source of supply of alternating current for the translating devices of the consuming circuit. The consuming circuit may be provided with translating devices of any form. The reliability of the system embodying my invention, however, enables the auxiliary source of supply to be used for furnishing current to railroad signalling systems that are dependent on local sources of supply, such as is found in small towns or cities scattered throughout the country. This subjects the operation of the railroad signalling systems to all sorts of conditions that greatly vary along a railroad system, with the result that if the local systems fall below certain potentials, which they very commonly do, the signal systems either do not operate or do not operate with the required efficiency. The invention particularly provides for the supply of the current to such systems in order to maintain the required current potential and quantity for the operation of the signalling devices.

In the system shown diagrammatically in the figure, the main lines 42 from the main source of supply are connected through a suitable knife switch 43 and the fuses 44 to the coil 26 of the switch 25, which operates to maintain a closed connection between the contacts 33 and 34 as long as the potential of the main supply circuit is sufficiently high. This maintains a closed circuit through the coil 3 of the automatic main line switch 1, which is also a high resistance coil, parallel to that of the coil 26 across the circuit of the main source of supply and the consuming circuit. The current from the main source of supply passes through the switch 1 and to the consuming circuit 45 through the connections 46 and 47. A suitable current measuring or indicating instrument 48 may be located in the connection 46. Also a suitable volt meter 49 may be connected across the consuming circuit 45. Thus the connection between the consuming circuit 45 may be maintained with the main source of supply circuit 42 as long as the potential is sufficiently great to cause a flow of a current through the coil 26 of a predetermined amount, the weight of the core 27 and the parts connected therewith, and also the elasticity of the spring 39, however, being such that when the potential of the main source of supply falls below a certain predetermined amount, such as below one hundred volts, the switch 25 will make contact with the contacts 35 and 36 and open the circuit through the coil 3, which relieves the switch 1 to be operated by the coil 4 of the switch 1.

When the switch 25 completes the circuit across the contacts 35 and 36 two connections are established from the storage battery 50. One connection is through the line 51, switch 103 and line 52, the switch 25, the connection 53, the coil of the magnet 54 to the battery through the connections 55 and 56. The magnet 54 operates the switch 58, and the other connection is through line 51, switch 103, line 52, the switch 25, line 101, coil 4, lines 81, 76 and 56 to the battery. The first connection establishes through the switch 58, also two connections, one from the battery through the lines 51 and 59, switch 58, line 88, dynamo 61, line 62, coil 65, line 80, ampere meter 79, line 78, one or more resistances 77 and switches 98, lines 76 and 56 to the battery, and the other connection is from the battery lines 51, 59, switch 58, lines 88, 102, coil 63, line 56 to the battery. This operates switch 64 to cut out the resistance of the connection through the meter 79 and the resistances 77, and establishes a low resistance connection between the battery and the dynamo, that is, through lines 51 and 59, switch 58, line 88, dynamo 61, line 62, coil 65, switch 64 and line 56 to the battery.

The coil 63 is a high resistance coil and coacts with the coil 65 to operate the switch 64, while the dynamo 61 is operating as a motor by the current from the battery 50. This is a lower resistance than the previous connection and permits a larger current to pass through the dynamo. This causes the dynamo to operate as a motor.

When the switch 58 is operated by the magnet 54 a short circuit of the magneto 66 to the ground through the connections 67 is opened and the magneto 66, which is driven by the shaft of the engine, supplies a high tension intermittent current to the spark plugs of the engine as the shaft is rotated by the dynamo 61.

When the switch 64 is closed it completes a circuit from the battery 50 through the connections 51 to the contact 68 of the current quantity indicator 69 which makes sequential contact with a plurality of contacts 70 located in the path of the movable contact 68 of the meter, whereby the circuit is periodically closed from the battery and through the connection 71 to an electromagnet 72 that operates the butter-fly valve 73 of the engine to close and open the valve periodically to give the required or desired starting fuel charges to the engine cylinders by periodically choking the carburetor air intake in the manner well known in the art. The circuit from the magnet 72 is completed through the connection 74, the switch 64 and the connection 56. The contact 68 continues to move over the contact 70 periodically operating the butterfly valve 73 until the engine is started or until the movable contact 68 passes beyond the arc in which the fixed contacts 70 of the meter are located.

When a current is established through the dynamo 61, a parallel circuit through the connections 99 and 100 is established through heat coils 75 that may be located around the arms of the intake manifold of the engine or in any other suitable place to heat the carbureted gasoline as it enters the engine and thus aids in the starting of the engine.

If the engine does not start before the Sangamo meter causes the movable contact 68 to complete its movement over the fixed contacts 70, the circuits already established through the operation of the switch 25 are opened. A switch 103 located in the circuit of the battery and switch 25 is opened, which opens the switch 58 and deenergizes the coil 4. The switch 103 may be opened by any suitable mechanical device operated by the rotating element of the meter, such as by a cam 104, shown diagrammatically in Fig. 6. This prevents farther discharge of the battery and the operation of the dynamo ceases.

If the engine starts before the movable contact 68 moves beyond the arc of the contacts 70, the current produced in the dynamo 61 will be opposite in direction to the current produced from the battery 50 and the dynamo will charge the battery. The direction of the current through the coil 65 will be opposite to that when the dynamo is operating as a motor and the current quantity that passes through the coil 65 will be sufficient to counteract the magnetic effect of the high resistance coil 63 to open the switch 64. This will open the circuit through the electro-magnet 72 that controls the butterfly valve 73 and the butterfly valve will remain open. The dynamo 61 continues to charge the battery through the circuits made by the connections established by the switch 58 through the connection 59, the Sangamo meter 69 to the battery 50, and from the battery 50 through the connections 56, 55 and 76, the adjustable resistance 77, the connection 78, the ampere meter 79, the connection 80, coil 65, line 62 to the dynamo 61.

The current through the coil 4 operates the switch 1 from the circuit established from the battery. These connections being permanent, while the engine is running, the switch 1 maintains the circuit of the auxiliary system closed with the consuming circuit 45. Immediately when the engine starts to drive the alternating current generator 82 and the dynamo 61, the dynamo supplies a potential to the coil 83 sufficient to lift its solenoid and close the circuit of the magnet 84 which is connected to one side of the battery and of the dynamo 61 by means of the connections 85, 86 and 62, and to the other side of the battery and dynamo by the connections 87 and 88. The coil 83 operates the switch 89 to close the circuit of the coil 84 through the connection 90, the switch 89 to the coil 83, the coil 84 thus being in a parallel circuit to the circuit of the coil 83. The switch 89 may thus be delayed in its operation not only by the sequence of operations caused by its adjustment as to the potential produced in the circuit of the dynamo and battery, but also by a dash-pot 91 which delays the movement of the switch 89. This permits the engine to run a short time after it has started and until it is enabled to carry the load that will be imposed upon the generator when it is connected to the consuming circuit. In other words, it gives opportunity for the engine to "warm up" before the generator receives the load of the consuming circuit. It also gives the generator opportunity to build up its potential to the required potential and sufficient for the demand made for the proper operation of the translating devices of the consuming circuit 45.

The magnet 84 operates the switch 92 which opens the circuit of the heat coils 75 and completes the circuit of the alternating current generator 82 through the switch 1 and thus the generator 82 is connected to the consuming circuit 45, the connection being through the switch 92, the connection 93, the knife switch 94, the fuse 95, the fixed contact 18 of the switch 1, the connection 47 to one of the supply lines 45 of the circuit, the other connection being from the generator through the connection 96 to the knife switch 94 and a fuse 95 to the fixed contact 17, the connection 46, the instrument 48 to the other line 45. The generator 82 will thus continue to supply the consuming circunit 42 until the potential of the main source of supply is restored and the main source of supply is enabled to carry the load of the consuming circuit.

The generator 82 will thus supply the current to the consuming circuit until the switch 25 is operated by an increased current through the high resistance or potential coil 26. When this occurs the switch 25 completes the connection through the contacts 33 and 34. The current from the main source thus passes through the high resistance coil 3 which is energized and a branch of the circuit through the coil 4 that leads from the battery 50 through the connections 51 and 52 to the contact 35, is opened. In response to the action of the coil 3 the switch 1 connects the main source of current supply to the consuming circuit, as heretofore described.

The auxiliary system is restored by the operation of the switch 25. The coil of the magnet 54 is in a parallel circuit to the circuit of the coil 4 and this also becomes deenergized sufficient to permit the opening of the switch 58, which breaks the circuit between the battery 50 and dynamo 61. The switch 58 closes the short circuit 67 to the ground from the magneto 66. The engine thus discontinues to fire and the generator 82 and dynamo 61 discontinue in their operations. If it is desired to start the auxiliary system for any reasons other than supplying a current to the consuming system, such as for charging the battery or testing the operation of the auxiliary system, etc., it may be done by a suitable switch connected in parallel with the controlling switch 25, such as the knife switch 57. This completes a circuit from the battery through line 51, meter 69, line 59, switch 57, line 60, contact 36 of switch 25. This completes the circuits through the coils 4 and 54 in the same manner that they are completed by the switch 25 when it closes the circuit between contacts 35 and 36. While the coil 4 is energized, but since coil 3 remains energized, the connection between the main supply system and the consuming system is not disturbed.

Suitable resistance adjusting devices, fuses and knife switches, such as the rheostat 97, the resistances 77 and the knife switches 98, may be inserted in different parts of the circuit for proper balancing of the parts of the circuit, for protection and for regulation of the current quantity and potential as may be desired.

I claim:

1. In an electric system, a consuming circuit, a supply circuit, a main line switch for connecting the consuming circuit with the supply circuit, an internal combustion engine driven dynamo, a storage battery connected to the dynamo, an alternating current generator connected to the engine, a controlling switch controlled by the potential difference of the current of the main supply circuit for operating the main line switch and for starting the engine, an electro-magnetic switch located in the circuit of the generator for completing the circuit of the generator to the main line switch when the potential of the dynamo has been substantially raised by the operation of the engine to a predetermined degree.

2. In an electric system, a consuming circuit, a supply circuit, a main line switch for connecting the consuming circuit with the supply circuit, an internal combustion engine driven dynamo, a storage battery connected to the dynamo, an alternating current generator connected to the engine, a controlling switch controlled by the potential difference of the current of the main supply circuit for operating the main line switch and for starting the engine, an electro-magnetic switch located in the circuit of the dynamo and controlled by the potential produced by the dynamo for completing the circuit of the generator to the main line switch.

3. In an electric system, a consuming circuit, a main supply circuit and an auxiliary circuit, an automatic main line switch for connecting the main supply circuit or the auxiliary circuit with the consuming circuit, an electro-magnetic controlling switch for operating the main line switch according to the potential difference of the main supply circuit, an engine driven alternating current generator located in the auxiliary circuit, and means controlled by the controlling switch for starting the engine to operate the generator.

4. In an electric system, a consuming circuit, an electro-magnetic controlling switch, an engine driven alternating current generator, a dynamo connected to the engine, a storage battery charged by the dynamo and operating the dynamo as a motor to start the engine, the circuit of the dynamo and of the battery controlled by the controlling switch for starting the engine, a switch in the circuit of the generator, and means for maintaining the switch open until the potential difference of the dynamo has been built up to substantially the value required for the consuming circuit.

5. In an electric system, a consuming circuit, a main supply circuit and an auxiliary circuit, an automatic main line switch for connecting the main supply circuit or the auxiliary circuit with the consuming circuit, an electro-magnetic controlling switch for operating the main line switch according to the potential difference of the main supply circuit, an engine driven alternating current generator located in the auxiliary circuit, means for starting the engine and controlled by the controlling switch, a switch in the circuit of the generator for connecting the generator with the consuming circuit, and means for maintaining the last named switch open until the engine has operated a period of time sufficient to enable the engine to carry the load to be placed on the generator when the last named switch closes.

6. In an electric system, a consuming circuit, a main supply circuit and an auxiliary circuit, an automatic main line switch for connecting the main supply circuit or the auxiliary circuit with the consuming circuit, an electro-magnetic controlling switch for operating the main line switch according to the potential difference of the main supply circuit, an engine driven alternating current generator located in the auxiliary circuit, a dynamo connected to the engine, a storage battery charged by the dynamo and operating the dynamo as a motor to start the engine, the circuit of the dynamo and of the battery controlled by the controlling switch for starting the engine, a generator switch for connecting the generator with the consuming circuit, and means for controlling the generator switch and maintaining it open until the engine has operated a short period of time.

7. In an electric system, a consuming circuit, a main supply circuit and an auxiliary circuit, an automatic main line switch for connecting the main supply circuit or the auxiliary circuit with the consuming circuit, an electro-magnetic controlling switch for operating the main line switch according to the potential difference of the main supply circuit, an engine driven alternating current generator located in the auxiliary circuit, a dynamo connected to the engine, a storage battery charged by the dynamo and operating the dynamo as a motor to start the engine, the circuit of the dynamo and of the battery controlled by the controlling switch for starting the engine, a generator switch in the circuit of the generator, and means for maintaining the switch open until the potential of the dynamo has been built up to substantially the value required for the consuming circuit.

8. In an electric system, a consuming circuit, a main supply circuit and an auxiliary circuit, an automatic main line switch for connecting the main supply circuit or the auxiliary circuit with the consuming circuit, an electro-magnetic controlling switch for operating the main line switch according to the potential difference of the main supply circuit, an engine driven alternating current generator located in the auxiliary circuit, a dynamo connected to the engine, a storage battery charged by the dynamo and operating the dynamo as a motor to start the engine, the circuit of the dynamo and of the battery controlled by the controlling switch for starting the engine, a generator switch in the circuit of the generator, and means for maintaining the switch open until the potential of the dynamo has been built up to substantially the potential required for the consuming circuit and until after the engine has operated a sufficient length of time to enable it to carry the load on the generator when the generator switch is closed.

9. In an electric system, a consuming circuit, an internal combustion engine driven dynamo, a source of current supply connected to the dynamo, a switch located in the circuit of the dynamo for starting the engine, and means controlled by the said switch for intermittently operating the choke valve of the engine to supply intermittently starting charges to the engine until the engine is started.

10. In an electric system, a consuming circuit, an internal combustion engine driven dynamo, a source of current supply connected to the dynamo, a switch located in the circuit of the dynamo for starting the engine, and means controlled by the said switch for intermittently operating the choke valve of the engine to supply intermittently starting charges to the engine until the engine is started, and means for opening the said switch when the dynamo fails to start after a predetermined number of operations of the choke valve controlling means.

11. In an electric system, a consuming circuit, a supply circuit, an internal combustion engine driven dynamo, a storage battery connected to the dynamo, an alternating current generator connected to the engine, a switch located in the circuit of the battery for starting the engine, an electromagnetc means located in the circuit of the battery for intermittently closing the choke valve of the engine to supply intermittently starting charges to the engine until the engine is started, a heat coil for heating the fuel directed to the engine, and means for connecting the heat coil to the circuit of the battery until the engine is started.

12. In an electric system, a consuming circuit, a supply circuit, an internal combustion engine driven dynamo, a storage battery connected to the dynamo, an alternating current generator connected to the engine, a switch located in the circuit of the battery for starting the engine, a current quantity indicator located in the circuit of the battery and of the dynamo and having an intermittent circuit closing means, an electro-magnet connected to the choke valve of an internal combustion engine and controlled by the intermittent circuit closing means to supply intermittent starting charges to the engine until the engine is started.

13. In combination with a main supply circuit and a consuming circuit, an auxiliary circuit having an automatic main line switch for connecting the consuming circuit with the main line circuit or with the auxiliary circuit, a controlling switch operated according to the potential difference of the main supply circuit for operating the main line switch, a storage battery and a dynamo, an internal combustion engine connected to the dynamo, the circuit of the storage battery and the dynamo controlled by the controlling switch, a current quantity indicator located in the circuit of the dynamo and of the battery, the current quantity indicator having a movable contact and a plurality of interconnecting fixed contacts, an electro-magnet connected to the fixed contacts, the circuit of the electro-magnet intermittently closed by the movable contact as it moves over the fixed contacts, the choke valve of the engine operated by the electro-magnet to supply intermittently starting charges of fuel to the engine until the engine is started.

14. In combination with a main supply circuit and a consuming circuit, an auxiliary circuit having an automatic main line switch for connecting the consuming circuit with the main line circuit or with the auxiliary circuit, a controlling switch operated according to the potential difference of the main supply circuit for operating the main line switch, a storage battery and a dynamo, an internal combustion engine connected to the dynamo, an alternating current generator connected to the engine, means for connecting the generator with the main line switch after the engine is started, the circuit of the storage battery and the dynamo controlled by the controlling switch, a current quantity indicator located in the circuit of the dynamo and of the battery, the current quantity indicator having a movable contact and a plurality of interconnecting fixed contacts, an electro-magnet connected to the fixed contacts, the circuit of the electro-magnet intermittently closed by the movable contact as it moves over the fixed contacts, the choke valve of the engine operated by the electro-magnet to supply intermittently starting charges of fuel to the engine until the engine is started.

15. In an electric system, a consuming circuit, a main supply circuit and an auxiliary circuit, an automatic main line switch for connecting the main supply circuit or the auxiliary circuit with the consuming circuit, an electro-magnetic controlling switch for operating the main line switch according to the potential difference of the main supply circuit, an engine driven alternating current generator located in the auxiliary circuit, a dynamo connected to the engine, a storage battery charged by the dynamo and operating the dynamo as a motor to start the engine, the circuit of the dynamo and of the battery controlled by the controlling switch for starting the engine, a generator switch in the circuit of the generator, and means for maintaining the switch open until the speed of the engine has been built up and maintained a short period of time so as to produce a generator potential difference substantially the same as that of the consuming circuit.

16. In an electric system, a consuming circuit, a main supply circuit and an auxiliary circuit, an automatic main line switch for connecting the main supply circuit or the auxiliary circuit with the consuming circuit, an electro-magnetic controlling switch for operating the main line switch according to the potential difference of the main supply circuit, an engine driven alternating current generator located in the auxiliary circuit, a dynamo connected to the engine, a storage battery charged by the dynamo and operating the dynamo as a motor to start the engine, the circuit of the dynamo and of the battery controlled by the controlling switch for starting the engine, a generator switch in the circuit of the generator, and means for maintaining the switch open until the speed of the engine has been increased sufficiently to produce a potential difference in the generator which is substantially equal to that required for the consuming circuit and until after the engine has operated a sufficient length of time to enable it to carry the load on the generator after the generator switch is closed.

17. In an electric system, a consuming circuit, a supply circuit, and an auxiliary circuit, a main line switch for connecting the consuming circuit with the supply circuit or the auxiliary circuit, an internal combustion engine driven dynamo, a storage battery connected to the dynamo for starting the engine, a generator mechanically connected to the engine and electrically connected in the auxiliary circuit, a controlling switch controlled by the potential difference of the current of the supply circuit for operating the main line switch and for starting the engine, and an electromagnetically operated means for preventing the completion of the auxiliary circuit with the consuming circuit until the engine has operated a short period of time and sufficient to enable the engine to carry the load to be placed on the generator.

In testimony whereof I have hereunto signed my name to this specification.

MARK C. COSGRAY.